United States Patent
Ristock et al.

(10) Patent No.: US 10,986,232 B2
(45) Date of Patent: Apr. 20, 2021

(54) SYSTEMS AND METHODS FOR SIZING MODULAR ROUTING APPLICATIONS

(71) Applicant: Genesys Telecommunications Laboratories, Inc., Daly City, CA (US)

(72) Inventors: Herbert Willi Artur Ristock, Walnut Creek, CA (US); Boris Livshyts, Daly City, CA (US); Nikolay I. Korolev, Concord, CA (US); Stefaan Valere Albert Coussement, Kortrijk (BE)

( * ) Notice: Subject to any disclaimer, the term of this patent is extended or adjusted under 35 U.S.C. 154(b) by 65 days.

(21) Appl. No.: 15/625,585

(22) Filed: Jun. 16, 2017

(65) Prior Publication Data
US 2018/0367672 A1   Dec. 20, 2018

(51) Int. Cl.
*G06F 15/173* (2006.01)
*H04M 3/523* (2006.01)
(Continued)

(52) U.S. Cl.
CPC ......... *H04M 3/5238* (2013.01); *H04M 3/365* (2013.01); *H04M 3/367* (2013.01); *H04M 3/5166* (2013.01)

(58) Field of Classification Search
CPC ............. H04M 3/5175; H04M 3/5238; H04M 3/5183; H04M 3/523; H04M 2203/402; H04M 3/5233; H04M 3/5158; H04M 3/51; H04M 3/5232; H04M 7/006; H04M 2201/42; H04M 3/5191; H04M 3/50; H04M 2203/408; H04M 3/42323; H04M 2201/54; H04M 2203/556; H04M 3/2218; G06Q 10/0631; G06Q 10/06375; G06Q 10/04; G06Q 10/06; G06Q 10/06315; G06Q 10/0639; G06Q 30/0202; G06Q 10/067; G06Q 10/063118; G06Q 10/063114; G06Q 10/063112; G06Q 10/063116; H04L 41/04; H04L 41/12; H04L 51/046; H04L 65/4007; H04L 67/1002; H04L 67/10; H04L 41/5038; H04L 41/00; H04L 47/125; H04L 67/1008; H04L 43/0876; H04L 47/76; H04L 65/1046; G06F 9/50; G06F 9/5077;
(Continued)

(56) References Cited

U.S. PATENT DOCUMENTS

| 5,911,134 A * | 6/1999 | Castonguay | G06Q 10/06 379/112.01 |
| 6,584,191 B1 * | 6/2003 | McPartlan | H04M 3/5232 379/265.02 |

(Continued)

*Primary Examiner* — Ahmad F. Matar
*Assistant Examiner* — Kharye Pope

(57) ABSTRACT

A method for allocating resources to modules of a contact center includes: receiving a first interaction in a first state; determining a first load of a first module of the contact center to be low; in response to determining that the first load is low, routing the first interaction to the first module of the contact center, the first module transitioning the first interaction from the first state to a second state; receiving a second interaction in the first state; determining a second load on the first module of the contact center to be high; and in response to determining that the second load is high, routing the second interaction to a second module configured to transition the second interaction from the first state to the second state, the second module having different resource requirements than the first module.

4 Claims, 13 Drawing Sheets

(51) Int. Cl.
*H04M 3/36* (2006.01)
*H04M 3/51* (2006.01)

(58) Field of Classification Search
CPC .............. G06F 9/505; G06F 9/5083; G06F 2009/4557; G06F 11/3414
USPC ............ 379/265.03, 265.01, 265.02, 265.06, 379/265.11, 266.08, 265.08, 265.12, 379/265.1, 265.13; 705/7.25, 7.38, 7.13, 705/7.14, 7.15; 370/352
See application file for complete search history.

(56) References Cited

U.S. PATENT DOCUMENTS

| | | | | |
|---|---|---|---|---|
| 6,868,154 B1* | 3/2005 | Stuart | ............... | H04M 3/51 379/221.01 |
| 6,970,829 B1* | 11/2005 | Leamon | ............... | G06Q 10/06 370/270 |
| 7,046,789 B1* | 5/2006 | Anderson | ............... | H04M 3/5175 379/265.01 |
| 9,813,558 B1* | 11/2017 | Brula | ............... | H04M 15/41 |
| 2005/0287983 A1* | 12/2005 | Armanino | ............... | H04M 3/2218 455/405 |
| 2008/0109343 A1* | 5/2008 | Robinson | ............... | G06Q 40/04 705/37 |
| 2009/0171752 A1* | 7/2009 | Galvin | ............... | G06Q 10/06 705/7.11 |
| 2010/0165977 A1* | 7/2010 | McCord | ............... | H04L 12/66 370/352 |
| 2011/0255683 A1* | 10/2011 | Flockhart | ............... | G06Q 10/06 379/266.01 |
| 2012/0016711 A1* | 1/2012 | Kosiba | ............... | G06Q 10/04 705/7.25 |
| 2012/0082303 A1* | 4/2012 | D'Arcy | ............... | H04M 3/51 379/201.02 |
| 2012/0101867 A1* | 4/2012 | Zgardovski | ............... | G06Q 10/063112 705/7.15 |
| 2012/0300920 A1* | 11/2012 | Fagundes | ............... | G06Q 10/06 379/265.05 |
| 2014/0254776 A1* | 9/2014 | O'Connor | ............... | H04M 3/5175 379/88.01 |
| 2014/0324499 A1* | 10/2014 | Placiakis | ............... | G06Q 10/063116 705/7.16 |
| 2015/0134831 A1* | 5/2015 | Hiroishi | ............... | H04L 67/1008 709/226 |
| 2015/0381715 A1* | 12/2015 | Patterson | ............... | H04L 67/101 709/226 |
| 2016/0088153 A1* | 3/2016 | Wicaksono | ............... | H04M 3/5175 379/265.06 |
| 2016/0112515 A1* | 4/2016 | Ohara | ............... | H04L 67/38 709/203 |
| 2016/0165052 A1* | 6/2016 | Reilly | ............... | H04M 3/5238 379/265.1 |
| 2016/0210172 A1* | 7/2016 | Ramachandra | ............... | G06F 9/5072 |
| 2016/0344804 A1* | 11/2016 | Otsuka | ............... | H04L 67/1008 |
| 2017/0097971 A1* | 4/2017 | Brown | ............... | G06F 17/30572 |
| 2018/0159977 A1* | 6/2018 | Danson | ............... | H04M 3/5158 |
| 2018/0198729 A1* | 7/2018 | Cook | ............... | H04L 65/60 |
| 2019/0220298 A1* | 7/2019 | Jiao | ............... | G06F 9/45558 |

* cited by examiner

@voice > c. Menu.1 > a.Sales Preparation   < X

Delete description.
The service parameters for the service group.

Reporting virtual queue:

Interaction Workspace override options:
Override:GRA Sample:Sales

Service Selection service 1 key:
UD_Category service 1 value:
GRA Sample/Sales service 2 key:
UD_Department service 2 value:
Sales service 3:
UD_CustomerSalesType/Uknown service 4 key:
UD_Product service 4 value:

service 5 key:
UD_Toastinformation service 5 value:

*Fig. 3a* service 6 key: ⓘ service 6 value: ⓘ service 7 key: ⓘ service 7 value: ⓘ service 8 key: ⓘ service 8 value: ⓘ service 9 key: ⓘ service 9 value: ⓘ

Interaction Flow next:* ⓘ

| @voice > c. Menu.1 > b.Sales Distribution 🔍 ✕ |

GRA.basicSegmentation.workflow: ⓘ

| {} |

[ Save ]  [ Cancel ]

Fig. 3b

@voice > c. Menu.1 > b.Sales Distribution   < X

Delete ⚙ description: ⓘ
The target selection for the sales group.

Feedback initial feedback: ⓘ
@ !. Initial Distribution Feedback   🔍 ✕ in-queue fedback: ⓘ
@ !. in-queue Distribution Feedback   🔍 ✕

Priority Tuning initial value: * ⓘ
1 increment: ⓘ interval: ⓘ maximum value: ⓘ

Target Selection target 1: ⓘ
TestAgentGroup   🔍 ✕ timeout 1: ⓘ
30 clear target 1: ⓘ
○ True
◉ False target 2: ⓘ
🔍 ✕ timeout 2: ⓘ clear target 2: ⓘ
○ True
◉ False

*Fig. 4a* target 3:

timeout 3:

Interaction Flow overflow:

@voice > c. Menu. 1 > c. Sales Overflow

GRA.basicDistribution.workflow:

{}

Save   Cancel

Fig. 4b

SYSTEMS AND METHODS FOR SIZING MODULAR ROUTING APPLICATIONS

BACKGROUND

1. Field

Aspects of embodiments of the present invention relate to the technical field of routing interactions in and between contact centers, the instantiation, configuration and operation of interaction or event routing applications, and the sizing or allocation of resources to event routing applications.

2. Related Art

In voice and/or multi-media contact centers, routing applications, which may be implemented in software, direct media events or interactions, such as telephone calls, emails, chat sessions, and the like, to groups of agents and knowledge workers, as well as to media servers and other computerized hardware, which are enabled to receive, switch, transfer and further route the media events.

Routing and management of events is a very specialized process highly dependent on purpose, business strategy and nature of enterprises hosting or operating such centers. A routing application may be loosely defined as a software set (which may include a software executable and routing strategy, instructions, and/or logic which may be provided as a script, which may be implemented in State Chart XML (SCXML): State Machine Notation for Control Abstraction, or as a set of rules, compatible with a platform set, that manages the receiving of communication events or media events, eliciting information to determine a purpose for individual events, managing routing of events to available agents determined to be capable of interacting with persons having initiated the communication events with respect to the determined purpose, recording events and interactions where appropriate, collecting and processing statistics, preparing and distributing reports, and the like. Depending on the nature of an enterprise, business purpose and strategy, and architecture of media servers, routing servers and other computerized equipment, developing a software set to provide a working contact center in a single instance can be a complicated, non-trivial task. In many situations more than one strategy with different purposes may be applicable, and operating parameters may vary by date, by time, and according to measurable circumstances and conditions, such as current call volume.

Therefore, developing a software set for an operable contact center operation requires highly trained engineers and technicians, and considerable time and testing, even when using higher level programming languages and development systems.

SUMMARY

Aspects of embodiments of the present invention are directed to systems and methods for configuring a contact center using a modular configuration system and for allocating contact center resources to modules in accordance with predicted conditions and real-time conditions within the contact center.

According to one embodiment of the present invention, a method for allocating resources to a contact center includes: receiving, by a processor, configuration data for configuring a contact center, the configuration data including parameters defining a plurality of modules, each of the plurality of modules being configured to provide a discrete function relating to contact center operation, wherein the parameters for a first module of the plurality of modules includes identification of a second module of the plurality of modules linked to the first module, wherein the plurality of modules are linked according to a routing strategy; receiving, by the processor, a predicted load of interactions to be processed by the contact center; computing, by the processor, based on the predicted load on the contact center, a first resource requirement of the first module; computing, by the processor, based on the predicted load on the contact center, a first output load of the first module; computing, by the processor, a second resource requirement of the second module based on the first output load of the first module; and allocating, by the processor, contact center resources to the first module and the second module in accordance with the first resource requirement and the second resource requirement.

The configuration parameters may include business level parameters excluding hardware resource parameters.

The modules may further include a third module and the configuration parameters further include a link from the first module to the third module, the first module may be configured to perform a first function, the second module may be configured to perform a second function, and the third module may be configured to perform a third function, wherein the method may further include receiving historical data regarding a first proportion of interactions that perform the second function after the first function and a second proportion of interactions that perform the third function after the first function, wherein computing the first output load from first module to second module may be performed in accordance with the first proportion.

The method may further include: computing a second output load from the first module to the third module in accordance with the second proportion; and computing a third resource requirement of the third module based on the second output load, and the allocating the contact center resources may be further performed in accordance with the third resource requirement.

The computing the first resource requirement may include: loading a first sizing calculator associated with the first module; and supplying the configuration parameters of the first module and the predicted load to the first sizing calculator to calculate the first resource requirement.

The computing the second resource requirement may include: loading a second sizing calculator associated with the second module, the second sizing calculator being different from the first sizing calculator; and supplying the configuration parameters of the second module and the first output load to the second sizing calculator to calculate the second resource requirement.

According to one embodiment of the present invention, a method for dynamically allocating resources to modules of a contact center during operation includes: receiving, by a processor, a first interaction in a first state; determining, by the processor, a first load of a first module of the contact center to be low; in response to determining that the first load is low, routing, by the processor, the first interaction to the first module of the contact center, the first module being configured to transition the first interaction from the first state to a second state; receiving, by the processor, a second interaction in the first state; determining, by the processor, a second load on the first module of the contact center to be high; and in response to determining that the second load is high, routing, by the processor, the second interaction to a second module configured to transition the second interaction from the first state to the second state, the second module having different resource requirements than the first module.

The first module and the second module may be associated with configuration parameters, the configuration parameters including business level parameters excluding hardware resource parameters.

The first module may be configured in accordance with a plurality of configuration parameters, the configuration parameters including business level parameters excluding hardware resource parameters, and the method may further include: receiving, by the processor, a third interaction in a first state; determining, by the processor, a third load of the first module to be high; and in response to determining that the third load is high, changing at least one of the configuration parameters to generate modified configuration parameters, the modified configuration parameters configuring the first module to reduce usage of contact center resources.

The first module may be configured in accordance with a plurality of configuration parameters, the configuration parameters including business level parameters excluding hardware resource parameters, and the method may further include: receiving, by the processor, a third interaction in a first state; determining, by the processor, a third load of the first module to be high; and in response to determining that the third load is high, allocating additional resources to the first module.

The resources may include at least one of CPU time, memory, I/O, trunk lines, routers, switches, and agents.

The allocating additional resources to the first module may include launching an instance of a server for the first module.

The launching of an instance of a server for the first module may include a lag time between beginning the launch process and the instance being ready, and the method may further include: estimating a time scale during which the third load will be high; comparing the time scale with the lag time; in response to determining that the time scale is shorter than the lag time, the allocating the additional resources to the first module includes changing a parameter of the parameters of the first module; and in response to determining that the time scale is longer than the lag time, the allocating the additional resources to the first module includes the launching the instance of the server for the first module.

The second module may be linked to a third module, and the method may further include: determining, by the processor, a third load on the second module in accordance with routing the second interaction to the second module; and modifying one or more parameters associated with the second module in accordance with determining that the third load is high.

According to one embodiment of the present invention, a system configured to allocate resources to a contact center includes: a processor; a memory storing instructions that, when executed by the processor, cause the processor to: receiving configuration data for configuring a contact center, the configuration data including parameters defining a plurality of modules, each of the plurality of modules being configured to provide a discrete function relating to contact center operation, wherein the parameters for a first module of the plurality of modules includes identification of a second module of the plurality of modules linked to the first module, wherein the plurality of modules are linked according to a routing strategy; receive a predicted load of interactions to be processed by the contact center; compute, based on the predicted load on the contact center, a first resource requirement of the first module; compute, based on the predicted load on the contact center, a first output load of the first module; compute a second resource requirement of the second module based on the first output load of the first module; and allocate contact center resources to the first module and the second module in accordance with the first resource requirement and the second resource requirement.

According to one embodiment of the present invention, a system configured to allocate resources to a contact center includes: means for receiving configuration data for configuring a contact center, the configuration data including parameters defining a plurality of modules, each of the plurality of modules being configured to provide a discrete function relating to contact center operation, wherein the parameters for a first module of the plurality of modules includes identification of a second module of the plurality of modules linked to the first module, wherein the plurality of modules are linked according to a routing strategy; means for receiving a predicted load of interactions to be processed by the contact center; means for computing, based on the predicted load on the contact center, a first resource requirement of the first module; means for computing, based on the predicted load on the contact center, a first output load of the first module; means for computing a second resource requirement of the second module based on the first output load of the first module; and means for allocating contact center resources to the first module and the second module in accordance with the first resource requirement and the second resource requirement.

BRIEF DESCRIPTION OF THE DRAWINGS

The accompanying drawings, together with the specification, illustrate exemplary embodiments of the present invention, and, together with the description, serve to explain the principles of the present invention.

FIG. 3a illustrates a portion of a parameter group in an embodiment of the invention.

FIG. 3b illustrates the balance of the parameter group of FIG. 3a.

FIG. 4a illustrates another parameter group in an embodiment of the invention.

FIG. 4b illustrates the balance of the parameter group of FIG. 4a.

DETAILED DESCRIPTION

Figure 1:
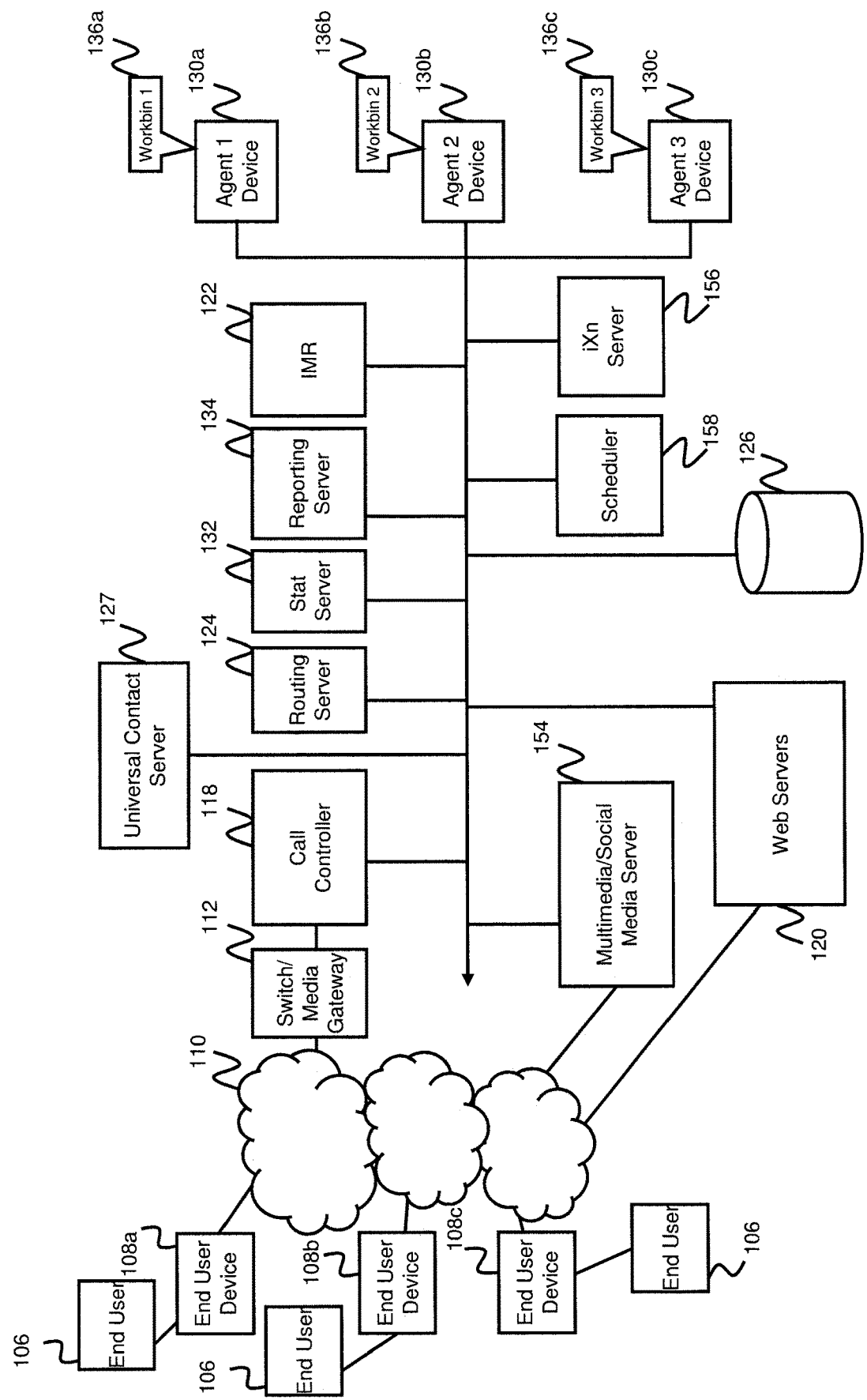
FIG. 1 is an architectural diagram of a communication infrastructure including a communication center in an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to systems and methods for configuring routing applications in a contact center, where the configuration process involves the connection of high level modules, that may be resized and executed in accordance with various orders or flows based on differing circumstances. Such a modular configuration system can also simplify the maintenance and modification of functions during operation (e.g., after deployment). Aspects of embodiments of the present invention can also reduce the costs of system development and operation.

Contact Center Overview

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system delivers services via telephone or other communication mechanisms through the use of Information and Communication Technology (ICT) resources (e.g. personnel, computers, and telecommunication equipment). The contact center system manages its usage of these ICT resources, and other management systems, such as network management systems, manage the ICT resources themselves. Such services may vary depending on the type of contact center, and may range from customer service to help desk, emergency response, telemarketing, order taking, and the like.

Customers, potential customers, or other end users (collectively referred to as customers or end users, e.g., end users 106) desiring to receive services from the contact center may initiate inbound communications or interactions (e.g., telephony calls, text messages, chat messages, and emails) to the contact center via their end user devices 108*a*-108*c* (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The routing server may also query other data stores, such as a workforce management system for accessing information about the line of business. The routing server may also perform a remote function call (or remote procedure call RPC) and incorporate the response to the remote function call in the strategy execution. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like), and may be created from a data warehouse (e.g., analytics data generated from processing information about previous interactions at the contact center, such as the Genesys® Interaction Concentrator and the Genesys® Info Mart).

The contact center system may further include a scheduler 158 for scheduling and managing the other components of the contact center system, as described in more detail below.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Modular Configuration of Contact Center Including Routing

As described briefly above, developing a software set for a contact center generally requires highly trained engineers and technicians, and considerable time and testing, even when using higher level programming languages and development systems. In addition, regular testing and maintenance is almost always required, and malfunctions of both hardware and software can cause curtailed operation or expensive downtime. As such, aspects of embodiments of the present invention are directed to systems and methods to design and build contact center support systems, including routing applications, using high-level modules that may be arranged and replaced like building blocks. In this way, embodiments of the present invention make it easier for non-specialists to create routing applications or strategies to manage the particular types of events and interactions encountered, or expected, by a particular contact center, as well as to understand the costs and resources required to implement these strategies.

In modular approaches according to various embodiments of the present invention, each module provides a specific function, and each module may be associated with or populated with particular parameters. Each module may be linked to another module for performing a successive function, such that the set of modules define one or more paths that an interaction can take through the modules of a contact center. In some embodiments a module may be associated with a specific media channel (e.g., telephone, text chat, or e-mail), or may be associated with multiple media channels. Within an end-to-end routing strategy, various media channels might be used with potential media switching within the same session, and multiple media may be used also concurrently.

Incoming interactions to the contact center are processed through a sequence of modules (e.g., an initial interaction with an interactive voice response (IVR) system, followed by identification of the customer on the interaction, and followed by routing to an agent based on the customer's identity and the reason for the interaction). The sequence of modules broadly defines a business strategy or routing strategy for handling the interactions at the contact center.

A set of such modules may suffice to provide building blocks to construct a variety of different routing applications or strategies, where the different routing applications are customized to serve the particular contact center requirements or demands of different enterprises. Each module may be configured to perform a function corresponding to various business functions to be performed by the contact center. For example, some contact centers may be dedicated to telephone calls, and therefore would include a module for processing telephone calls. Another contact center may handle both telephone calls and emails, and therefore a module for processing email may be included along with a module for telephone calls, where the relative amounts of contact center resources dedicated to the two modules are scaled based on the volume of traffic in those channels. Some contact centers may include multiple tiers of support services, where higher tier customers receive priority support and experience shorter hold times, and therefore embodiments of the present invention may include modules for performing identification of the tiers of customers and routing of customers based on tier, as well as modules corresponding to different categories of agents.

Further, in embodiments of the present invention, new modules to perform additional functions may be built offline and inserted to an existing application to fulfill changing requirements. For example, a contact center may add functionality for providing customer support through social media channels, and an existing routing application can be updated to provide this functionality by adding the new social media modules. Some embodiments also make use of composite blocks, which include combined basic blocks arranged in a desired way, can be used in the same way as basic blocks. For example, a multi-tier support module may include multiple modules (or sub-modules) corresponding to the different tiers of support, along with a module for routing the interactions to the different tiers of support based on current call loads and customer information. This composite multi-tier support module can then be used to easily provide a multi-tier configuration in contact centers, without requiring the user to manually construct a combination of modules to provide the multi-tier support functionality.

Further to the building of customized routing applications for a particular contact center, aspects of embodiments of the present invention are directed to systems and methods for managing the operation of a call center through a scheduler 158. The scheduler 158 routes interactions to modules in accordance with an order as designated in a routing application (in some embodiments, the order has multiple branches, where the interactions may be routed to different modules based on current conditions at the contact center), performs checks and balances, and controls interaction flow as an incoming interaction is managed, routed, connected and completed. These operations are described in more detail below, and provide a system that is modular, capable of calling and using modules in different orders under differing circumstances, and capable of simplified maintenance and modification of function during operation. Aspects of embodiments of the present invention are also directed to monitoring contact center activity and conditions, such as traffic, and managing contact center operations based on the monitored activity and conditions.

Figure 2:
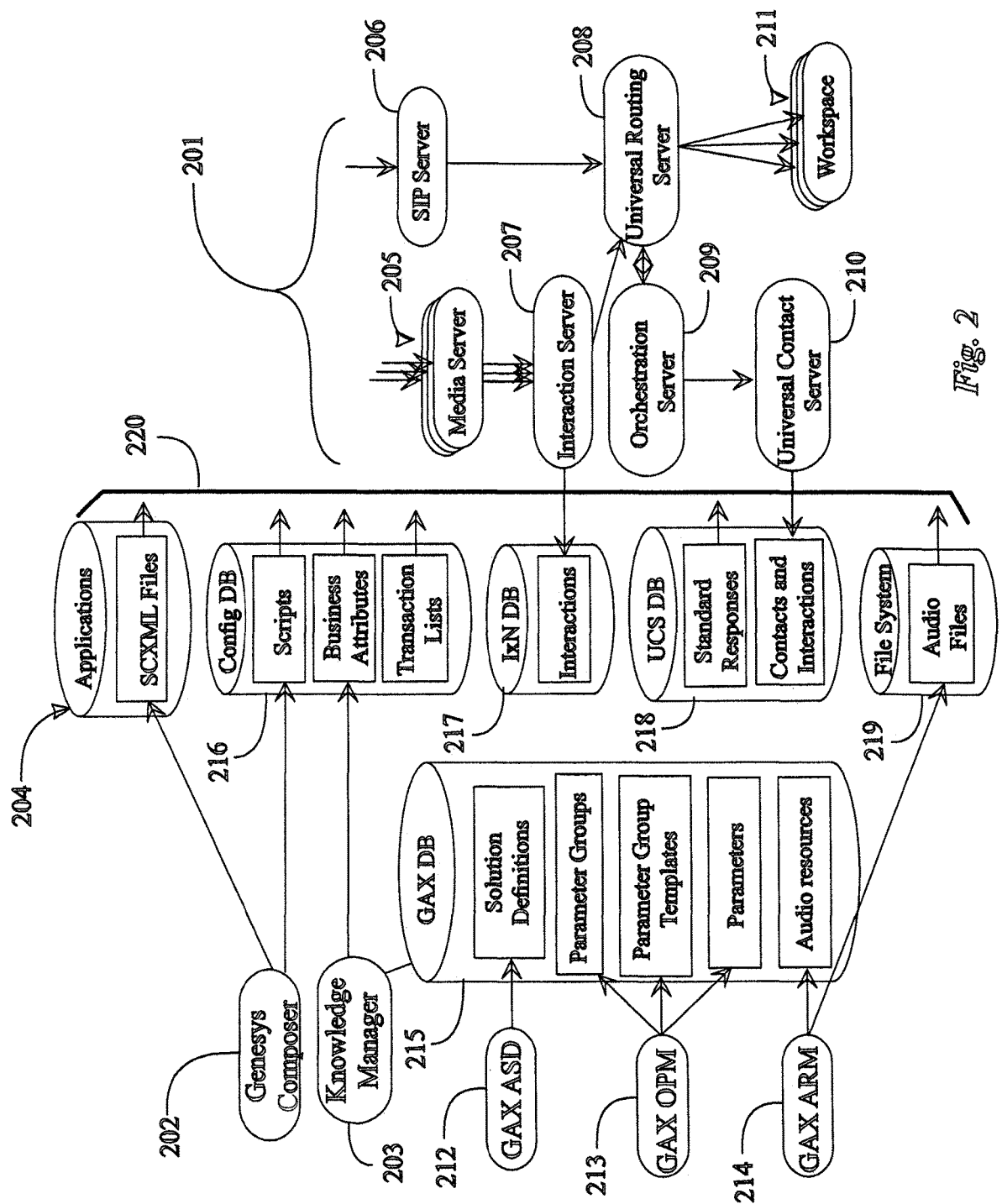
FIG. 2 is an illustration of functions in creating routing applications in an embodiment of the invention.

FIG. 2 is a diagram illustrating at a high level architecture and processes involved in building a modular routing application as a cooperating set of routing strategies. The process brings a high level of abstraction to design and development of routing strategies. The routing application (RA) is deployable as a standalone product (such as a piece of software that is downloaded and installed on one or more computers). Embodiments of the invention may use an agent desktop interface such as Genesys Interaction Workspace and a Universal Contact Server (UCS) for storing contact and interaction history. Embodiments of the present invention are directed to providing the most common features of contact centers. For example, some embodiments of the present invention may provide full support for agent desktop interfaces (e.g., Genesys Interaction Workspace), which, in one embodiment, includes transfer, conference, consult interactions, contact history, and interaction history.

In FIG. 2, components 201 are computerized hardware elements in a contact center, such as the contact center of FIG. 1. SIP Server 206 is analogous to the call controller 118 in FIG. 1. Universal Routing Server 208 is analogous to routing server 124 in FIG. 1. Interaction Server 207 is analogous to Interaction Server 156 in FIG. 1. The routing application or routing applications generated through the modular configuration process according to one embodiment of the present invention may be deployed on and executed by, for example, the routing server 124, and may also be used to configure and operate other hardware such as the interaction server 156, the interactive media response 122, and the multimedia/social media server 154.

In FIG. 2, bracket 220 indicates database entities that store modular GRA components as they are created and configured in a process for providing building blocks for use in orchestrating routing applications for a variety of needs of a variety of enterprises, by controlling the order in which the modular components are called and executed. Routing applications may be stored as SCXML files in application repository 204, and scripts, business attributes, and transaction lists may be stored in Config Database 216. Interactions may be stored in Interaction Database 217, standard responses and contacts may be stored in UCS Database 218, and audio files are stored in File System 219. One of skill in the art will understand that the organization of data into repositories and databases is merely one example, and that embodiments of the invention encompass other ways of organizing the storage of data. Furthermore, embodiments of the present invention are not limited to the particular data sources shown in FIG. 2. Other data sources, such as workforce management data, may be available to the routing application, both at runtime and during configuration.

The modular building blocks for a routing application according to embodiments of the present invention are prepared and configured using high level software applications, as indicated on the left of FIG. 2. One example of a module configuration tool that can be used for configuring a routing application is Genesys® Composer 202, a product of Genesys Telecommunication Laboratories, Inc. of 2001 Junipero Serra Blvd., Daly City, Calif. 94014. Another example of a configuration tool is Genesys® Designer, which is also a product of Genesys Telecommunication Laboratories, Inc. of 2001 Junipero Serra Blvd., Daly City, Calif. 94014. Other examples of tools are Genesys® Administrator Extension (GAX), elements 212, 213, and 214, and Knowledge Manager, element 203, which are also products of Genesys Telecommunication Laboratories. Embodiments of the present invention are not limited to the tools provided by Genesys Telecommunication Laboratories, and instead also encompass other tools that may be used in creating modular routing applications using building blocks based on processes similar to the processes described in enabling detail herein, and that the particular tools described herein are merely examples.

Routing Apps developed according to the processes described have a modular structure. The module-units may be based on groups of parameters, each representing a high-level aspect of a routing app. For example, in the case of Genesys Administrator Extension, these may be GAX-OPM (Operational Parameter Management) parameter groups. For example, a "basic distribution" parameter group may be used to configure how interactions are routed to agent groups. These parameters may include the number of agent groups, timeouts, and other business function parameters related to the distribution phase of an interaction. In some embodiments, these parameters exclude low level technical parameters or hardware resource parameters such as the number of CPU cores (or CPU time), the amount of memory, network bandwidth, or type of server instance allocated to execute a module.

Groups of parameters for various modules may be linked together to form a complete application or strategy for a particular contact center of a particular enterprise and a particular purpose. For example, a typical routing application might begin with receipt of an incoming interaction, which calls an entry module, then moves to a validation module to validate that the service is able to process the interaction, followed by one or more segmentation modules and classification modules to select detailed services for the interaction, and finally arrives at a distribution module to distribute the interaction to one or more agents assigned to the service. Each of the modules is configured by a group of parameters. For example, the group of parameters for the validation module may include one or more conditions that must be met by the interaction in order for it to be validated. As another example, the groups of parameters for the segmentation modules and classification modules may include rules for how the interaction is segmented or classified based on characteristics of the interaction (e.g., whether the interaction involves a high priority customer). The links between the modules (e.g., which module the interaction is passed to the module identified by "next") are part of the parameter group, and thus the order in which the modules are accessed during the routing of an interaction can be modified through relevant parameters. As such, the modular routing application or modular routing strategy can be viewed as a directed graph, where the modules are the nodes of the graph and the links are the directed edges from one module to the next module. The module configuration tool may dynamically build a routing application by following the links in the parameter-groups and output a packaged set of configured software for deployment onto contact center hardware (e.g., one or more computer systems which may be located in a data center supporting a contact center).

Generally, a developer may create modules or building blocks, which are Parameter Groups with corresponding Workflows (e.g., a module for performing segmentation in accordance with parameters). Workflows may be created through the module configuration tool, and parameter groups may be created through a parameter management tool (e.g., GAX-OPM). Creating a parameter group may include accessing a library of parameters to be entered into parameter templates. Parameters from called parameter groups are applied in conducting associated workflows.

FIGS. 3a and 3b show a parameter template with entry fields for providing a parameter group named @voice>c.

Menu.1>a. Sales Preparation. Not all of the fields (or parameters) are filled, as some of these fields are optional and are not needed to control the associated workflow. One of the fields shown in FIG. 3b is labeled "next" and denotes what module and corresponding parameter group is to be executed after the present one, and therefore the "next" field corresponds to the links between modules. In this example the next parameter/workflow is @voice>c. Menu.1>b. Sales Distribution. In other words, after the interaction has completed the Sales Preparation module, the interaction proceeds to the Sales Distribution module.

FIGS. 4a and 4b illustrate a template for creating the parameter group @voice>c. Menu.1>b. Sales Distribution, listed as "next" in the parameter group of FIGS. 3a and 3b. The interaction flow is "overflow," as listed.

Figure 5:
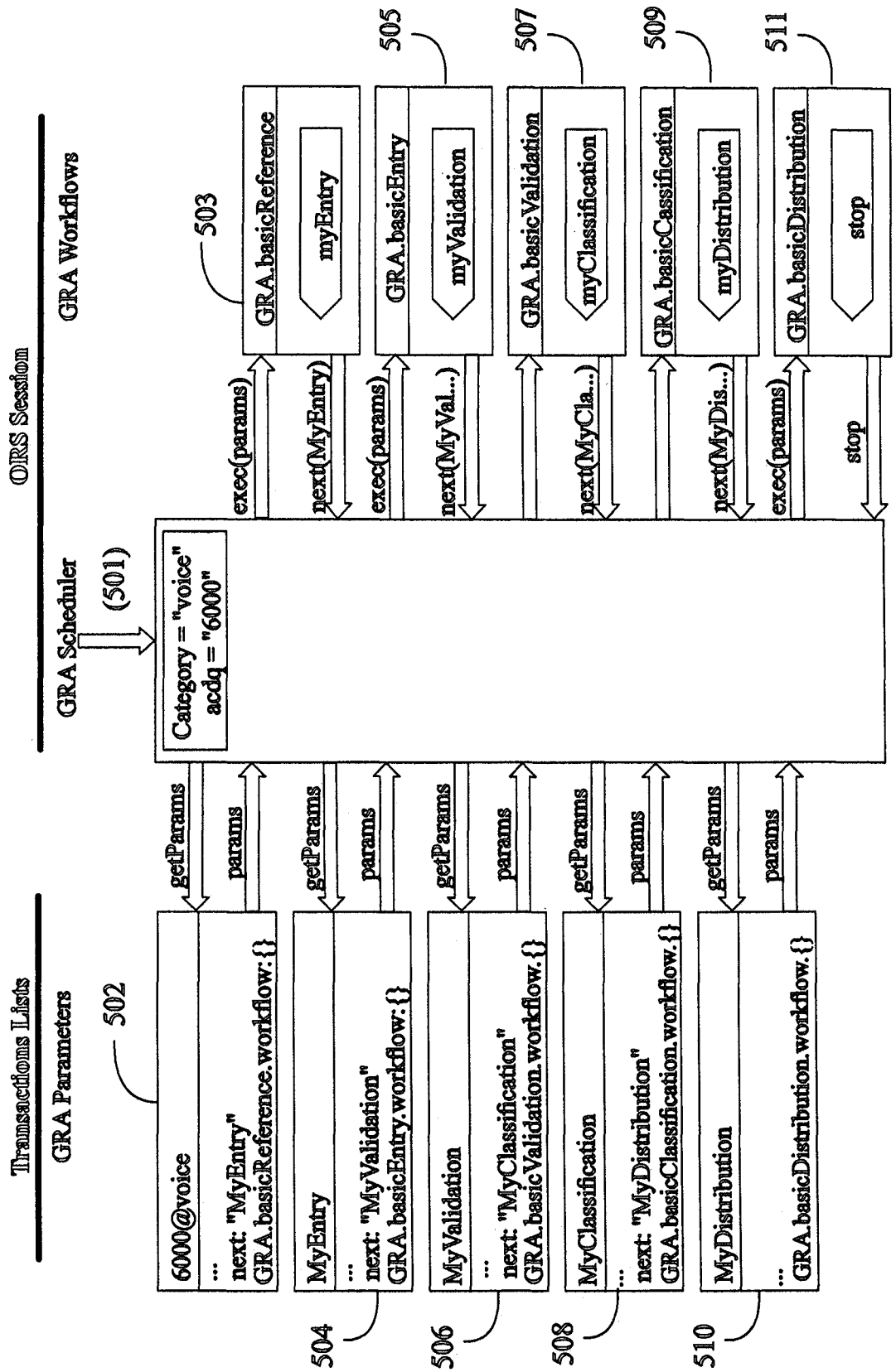
FIG. 5 illustrates an execution strategy for routing apps in an embodiment of the invention.

The routing application platform, with modular building blocks of workflows that may be called to perform according to specific parameter groups provides a method not only for creating the building blocks, but a method in which the blocks may be called and used to orchestrate a routing application created for a particular need of a particular enterprise. FIG. 5 illustrates the performance score for an orchestrated routing application using parameter groups and associated workflows.

In one embodiment, the scheduler 158 is an application that runs in the background on a platform in a contact center, or may be called into execution for receipt of each incoming interaction, and is enabled to call and execute parameter blocks and associated workflows that are linked by the parameter blocks themselves. FIG. 5 illustrates an execution strategy for a routing application configured according to one embodiment of the present invention. In one embodiment, this process is started and executed to completion for each interaction that comes to a contact center.

First, an interaction comes in to a routing point and triggers a scheduler session. The scheduler 158 looks for relevant data attached to the incoming interaction to determine a first parameter group to load. In this example, this parameter group is "6000@voice" (502). Next the scheduler 158 reads operational parameters (OPM) for this group. In one embodiment, this operation is repeated each time the scheduler 158 loads a parameter group. One of the parameters in the 6000@voice parameter group indicates which workflow (or module) is to be executed. In this example, the workflow to execute is "GRA.basicReference.workflow". The scheduler 158 receives the parameters and begins execution of the proper workflow following the parameters. Another of the parameters indicates the next workflow block, which is "My Entry". As seen in the GRA Workflows portion of the execution diagram, at 503, the scheduler 158 follows the workflow with the retrieved parameters to steer the workflow to completion, then sends an event to the scheduler 158 to load the "My Entry" parameter in block 504. The scheduler 158 executes workflow basicEntry, following the operational parameters retrieved in block 504. This stepwise process of retrieving parameters and executing corresponding workflows or modules based on the parameters continues until a workflow sends a "stop" event back to the scheduler 158. As such, the processing continues from block 505 through block 511, at which point a "stop" event is communicated to scheduler 158, which completes the routing of the interaction.

The modular structure of the workflows makes it simple and easy to extend the standard routing applications by developing a new parameter-group-template and the corresponding workflow or module. When the new parameter-group-template is deployed and some other parameter group references this newly deployed group, the module configuration tool will automatically link to the corresponding new workflow or module.

As a more specific example, a typical routing app starts with a group to set some common parameters, using Basic Entry Group. The routing app then checks entry conditions such as service status and calendars, and sends some welcome feedback, using Basic Validation Group which in turn will use one or more of Service Status Group, Opening Hours Calendar Group, Exceptions Calendar Group, or Basic Feedback Group, all of which may be standard parameter groups implemented in the routing application platform. The scheduler 158 will then select a service using one or more of GRA Data-Based Segmentation Group, GRA Tone Menu Based Segmentation Group, GRA Text Menu Based Segmentation Group, and GRA Screening Based Segmentation Group. The scheduler 158 will set parameters for the selected service using GRA Basic Classification Group, possibly followed by more detailed checking of conditions and service selection, then finish the selection of a target, using GA Basic Distribution Group.

In some embodiments, the parameter groups and workflows pre-prepared and available for deployment of a routing application platform to an enterprise (e.g., an enterprise deploying a contact center). These preconfigured, standard parameter groups are applicable to many routing scenarios. As such, the designer of the contact center system can focus on the business functions to be performed by the contact center and select the modules, workflows, and parameter groups, that fit the business needs, rather than the technical details of how the functions are performed. The enterprise, however, is not limited to the pre-prepared groups, and may use configuration tools to amend, streamline, and change routing applications to fit the needs of the contact center.

Embodiments of the present invention may support following business objectives: a solution to quickly and inexpensively deploy routing apps for interactions across different media types; an environment that can quickly and interactively illustrate a good subset of the most common contact center features, and that can be used during technical presentations and workshops; an environment for design and development of routing apps on a higher conceptual level, providing a reasonable compromise between simplification and customizability of the solution, and requiring limited technical expertise; an environment that provides a full set of tools and routing objects to enable the use of Interaction Workspace as an agent Desktop and Universal Contact Server for contact/interaction history; an environment that is easy to localize, customize and extend in the field, if and when needed.

Aspects of embodiments of the present invention also include the following technical features: an environment to develop routing apps for interactions across different media-types; app development based on generally available components; app routing flow development using templates in GAX-OPM. There is no need for an app developer to touch configuration tool when developing a routing app that is based on existing templates; the environment promotes re-use and sharing of the different elements of the environment and the developed routing app, thus reducing the effort to test and maintain the environment and routing apps; the environment is easy to modify, extend and customize by an expert in the field. This may involve the use of the configuration tool to adapt routing workflow templates; the environment provides full support for the agent desktop (e.g., Interaction Workspace), making sure every field in the agent desktop that needs to be populated by the routing strategy is handled—specifically the contact history. Handle every function that requires an action in the routing strategy—for instance voice interaction reject, agent transfer/conference/consultation; and the different media types are made to behave similarly.

The deployable routing application platform supports a number of additional features. For example, embodiments of the present invention may be configured to support a plurality of different media types including: voice; instant messaging; email (including web-email); chat; and short messaging service (SMS) in both session mode and paging mode.

Embodiments of the present invention may also operate in single-tenant (e.g., one enterprise using a particular deployment of hardware and software) and multi-tenant environments (e.g., multiple enterprises operating on the same deployment of hardware and software). Embodiments of the present invention may also operate in single-switch and multi-switch environments.

In various embodiments of the present invention, enterprise and customer (caller) facing components, including documentation and the configuration tool and the parameters of the modules, can also be localized to a variety of languages (e.g., English, Chinese, German, Spanish, French, Japanese, Portuguese, Russian, and Turkish) without altering the overall architecture of the modular routing configuration system.

According to embodiments of the present invention, the Universal Contact Server can be configured to record voice contacts and interactions, record unidentified voice contacts/interactions, record SMS contacts and interactions, and record other media types such as chats conducted over the Internet and social media posts or private messages.

According to embodiments of the present invention, the agent desktop or interaction workspace can be configured to support: transfer of an interaction to local contact center target; conferencing a local contact center target into a voice or chat interaction; forwarding of an email to external email-address; voice, IM or chat consultation of a local contact center target; making new voice calls, sending new emails to contacts; sending new SMS messages to contacts; providing a number of agent and agent-group workbins; interaction-workspace override options; and agent-reject of voice calls.

Allocation of Contact Center Resources to Modules

As noted above, some aspects of embodiments of the present invention relate to allocating resources to the various portions of the contact center corresponding to the modules of the configured routing application. In various embodiments of the present invention, the allocations can be done prospectively based on predictions of load, as well as in real-time, e.g., in accordance with current conditions at the contact center.

Aspects of embodiments of the present invention relate to systems and methods for configuring a contact center, including routing applications of a contact center, using a modular configuration system in which modules that serve particular functions are linked together into interaction flows that govern how an interaction is processed by a contact center. As such, aspects of embodiments of the present invention relate to automatically generating a set of software that executes the strategy set by the designer, where the software is deployed on hardware that supports the contact center. This hardware may include, for example, computer systems (e.g., virtualized computing devices) in data centers, data storage devices (e.g., databases and network attached storage devices), voice telecommunication lines, office space and desks for human agents and managers for the human agents, networking hardware including switches and routers, and the like.

Generally, the resource requirements of a contact center increase as the load increases on a contact center (e.g., as the number of interactions increases). For example, as more telephone calls are received by a contact center, customers may have longer hold times if the number of agents does not scale accordingly. As such, as the call volume increases, the number of voice resources such as human agents, trunk lines, network bandwidth, switches, voice-over-IP (VoIP) servers, and the like may be scaled based on the load. As another example, the amount of computer memory consumed by a routing application may increase (e.g., linearly) with the number of active interactions, and therefore the amount of memory allocated to the routing application or the number of servers running the routing application may be allocated based on the predicted or current load of the contact center. Other types of modules that provide various functions may have different types of requirements such as heavy computation demands versus input/output demands versus memory demands. For example, a text chat module may have relatively low input/output demands and memory demands. As another example, a call recording module may have relatively high input/output demands, but low computation demands. As a third example, a speech recognition module (e.g., for automatically recognizing speech within voice interactions between customers and agents, and performing analytics on the analyzed speech) may have relatively high demands in computation, memory, and input/output.

As a result, aspects of embodiments of the present invention relate to load-estimation, which enables assessment of required Information and Communication Technology (ICT) capacity when designing a given composed routing application strategy, and potential optimizations such as selecting alternative modules with same or similar functionality under different load characteristics, changing execution order of routing application modules, and adjusting parameters modules and allocation of resources to the modules as those parameters may impact sizing and load. Aspects of embodiments of the present invention also allow analysis of the strategy in advance of building the hierarchy of resources that implement the strategy (where the hierarchy may include the overall strategy, supported by the modules, which are supported by the underlying physical hardware). The hierarchy can later be adjusted, during runtime, in response to changing load conditions. Performing this analysis at the design stage allows the designer of the strategy to design which path or strategy to take based on load conditions. For example, if particular modules are overloaded, the strategy may be designed to provide relief at those particular modules that are most heavily loaded.

In one embodiment, each module or parameter group includes a self-sizing calculator, which provides an estimate for resource requirements and processing capacity (or maximum load) during execution. Depending on the function of the particular module, the sizing calculator takes as input all or a subset of various forms of load data, such as (but not limited to): overall number of agents, supervisors and administrators; number of inbound and outbound voice agents; peak arrival rate of inbound calls; average number of inbound voice interactions per time interval, such as month; percentage of transferred calls; percentage of conference calls; average duration of IVR interaction; average interaction queuing time; maximum busy hour queuing time; average inbound and outbound call duration; average wrapup time; percentage of outbound calls answered by live person; percentage of outbound calls answered by answering machine or fax; maximum number of simultaneous "text to speech" sessions; maximum number of simultaneous "Automatic Speech Recognition" sessions; percentage of inbound calls that are entirely self-service on IVR; required retention period for customer contact records; required retention period for chat and email transcripts; required retention period for historical reports; percentage of recorded calls/recorded agent screen sessions; required retention period for call recordings and screen recordings; number of email agents; average and maximum number of email interactions per time interval, e.g. per day, month; peak email interaction rate; average email handling time by agent; average email size; number of chat agents; number of messages between agent and customer per chat session; average size of chat messages; peak and average chat interactions per time interval, e.g. day or month; number of individual/group mailboxes; number of concurrent reporting users; and reporting complexity such as number of statistics, refresh frequency.

In some embodiments, the sizing calculator of each module, which is associated with a parameter block, takes the selected subset of business load data (e.g., number of interactions per hour) as input, and computes corresponding ICT load data or resource requirements to handle up to that maximum business load. These resource requirements may include CPU performance (e.g., latency or instructions per second), the number of allocated CPU cores (e.g., when using technologies such as virtual machines or containers) memory consumption, input/output operations per second (IOPS), storage size, and bandwidth for inter-process communication. Such load info may be provided for referencing architecture components—one or several—which may be allocated to execute the given module, such as an orchestration server, a routing server 124, stat server 132, SIP server or call controller 118, T-Server, interaction server 156, and recording servers, many of which are referenced in FIG. 1.

An appropriate reference architecture may be selected from a list of options in a process of constructing or allocating a contact center system for an enterprise. In some embodiments, the system architecture is proposed interactively during the process of using the software tool to design the contact center from the modules.

For example, a reference architecture for a text chat server may list specifications such as a 1 megabit/sec connection, a single core processor (or a single allocated core of a multicore processor), and 1 gigabyte of memory as being capable of serving up to 16,000 simultaneous chat interactions (e.g., separate chat sessions). As such, each of the modules may include information about the hardware resources needed to deploy the module for a given call load.

Using the resource requirements set forth by the module simplifies the process of allocating resources to the various modules based on the predicted or current resource demands of the contact center. Because the sizing parameters and scaling strategies are specific to the module and automatically calculated based on inputs, there is no need for the system designers to know the underlying technical details of the hardware (e.g., how many servers and the specifications of the servers). Continuing the above example, assuming the contact center expects to have a peak text chat volume of 30,000 simultaneous chats, then three servers as specified above (or a single server with triple the capacity) may be sufficient to handle the load. The hardware resource requirements for each such module may be determined based on tracking the responsiveness of various modules as deployed in customer systems or based on analysis of the modules themselves (e.g., analysis of the memory requirements for each session).

During the design of the contact center and/or the initial deployment of resources to activate the contact center, aspects of embodiments of the present invention are directed to predicting the expected load of the system and the corresponding resource requirements. These predictions may be made based on, for example, historical data from similar contact centers, such as data stored in the stat servers 132 of the similar contact centers.

For example, when configuring a contact center for an electronics company to provide sales and customer support through text chat and phone channels, the computing requirements of other contact centers for similar companies (e.g., electronics companies of similar size and sales volume) may be used to predict the hardware requirements for this particular enterprise. In some circumstances, where a modularly configured routing application is to replace an existing routing application, predictions may be made based on the loads being handled by the existing routing application.

The block sizing calculator provides load data for one execution pass. Within a strategy, blocks are executed sequentially, which gives sizing information for an end-to-end strategy execution. Within a production deployment, many interactions are processed concurrently, with various stages of completion in the end-to-end strategy. For overall load estimation, an aggregation sizing calculator can be used to estimate the load when executing blocks concurrently. This aggregate load is not necessarily the sum of individual blocks loads. For example, due to the timing of processing by different blocks or modules, the aggregate load may be less than the sum of the individual blocks. As another example, due to additional overhead of coordination between the blocks or modules, such as the copying of data between processes or processors that perform the different functions, the aggregate load may be greater than the simple sum of the parts. In some embodiments, the aggregation sizing calculator collects information about aggregated loads based on testing with the given applications and architecture.

In some embodiments of the invention, sizing data is normalized for a standard or reference ICT platform, and may be adjusted and calibrated to a given customer environment. For a composite strategy with multiple modular blocks, an aggregate load or resource requirement may be calculated. This enables assessment of the ICT capacity (e.g., resources) required to implement a given or proposed configuration or routing strategy. Options include selecting alternative modules with the same or similar functionality, but different load characteristics, changing execution order of modules, and adjusting parameters of the modules that impact on sizing and load. In some embodiments of the present invention, these sizing data may be set globally in the software configuration tool to create a composite strategy that includes parameter groups and associated workflow blocks.

The load handled by one module impacts the load experienced by the following or downstream modules. For example, a module for providing an initial IVR service may end up routing 90% of all the interactions that it receives. Therefore, the load experienced by one module may be used to predict an output load of the module, in other words, the load or loads that would be experienced by the next module or modules in the strategy (e.g., by following the outbound links or edges from the module). For example, historical data may indicate that 60% of interactions initially handled by an IVR are routed to agents, 30% are routed to another self-help system, and 10% of interactions end (e.g., the customer hangs up). In such a case, assuming, for example, an incoming load of 1,000 interactions per hour, the predicted output loads of the IVR are 600 interactions to be handled by agents and 300 interactions to be handled by a self-help system. As another example, historical data may indicate that about 10% of customers proceed with answering the automated surveys after completing an interaction with an agent. As such, assuming that a module corresponding to agents at a contact center is predicted to have an incoming load of 1,000 interactions per hour, then a module corresponding to the automated post-call survey system may be predicted to have an incoming load of 100 interactions per hour.

As such, the modular configuration of a contact center embodiments of the present invention allow the simplified deployment and allocation of resources based on the predicted or current contact load, by scaling the resources allocated to each module in the configuration based on the hardware resource requirements of the module.

Figure 6:
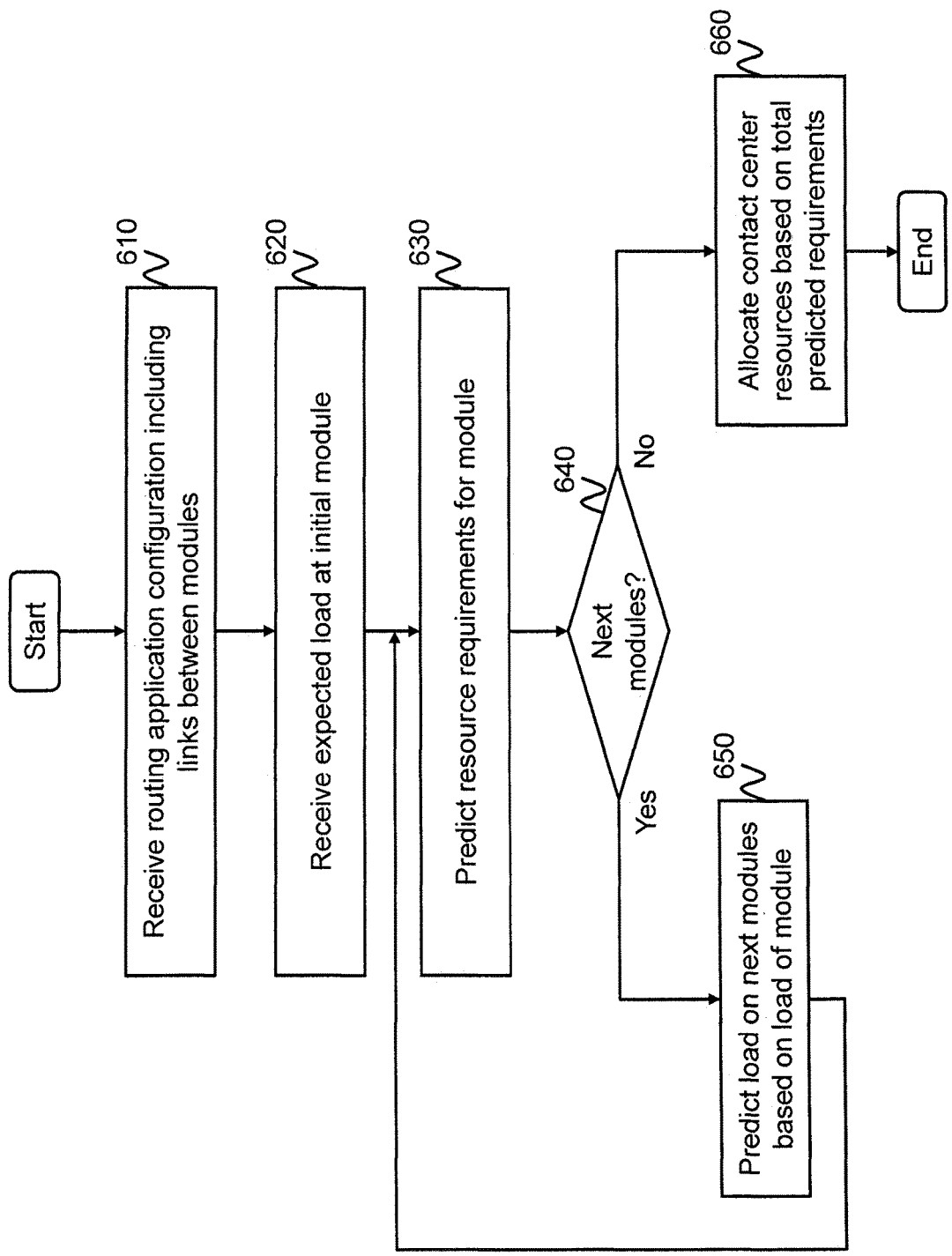
FIG. 6 is a flowchart of a method for allocating resources to modules, during setup, in accordance with one embodiment of the present invention.

FIG. 6 is a flowchart of a method for allocating resources to modules, during setup, in accordance with one embodiment of the present invention. In one embodiment, as described herein, the setup is performed by the scheduler 158, but embodiments of the present invention are not limited thereto. In operation 610, a routing application configuration is received, such as one or more SCXML files that list the modules included in the routing application and the parameters associated with each of the modules, including the links between the modules (e.g., specifying which module or modules the interaction is routed to after the current module). The routing application configuration may be generated by a system designer using the module configuration tool. In operation 620, the scheduler 158 receives a predicted load for the routing application. The predicted load may include information such as the expected number of interactions (calls, emails, texts, and the like) that will be handled by the contact center over a time period (e.g., per hour).

In operation 630, the scheduler 158 predicts the resource requirements for handling the load by the module (e.g., the predicted load) based on the configuration parameters of the module. In one embodiment, computing the prediction includes supplying the predicted load and the parameter group of the module to the block sizing calculator of the module to estimate the resource requirements of the first block.

In operation 640, the scheduler 158 determines if there are any next modules that will receive the interaction after the interaction has been processed by the module. For example, the module may generate events such as interactions, messages, logs, reports, and the like, which may be supplied to other modules.

If so, then in operation 650, the scheduler 158 predicts the loads on those next modules (e.g., the output loads of the current module on the next modules), based on the predicted input load on the module. The scheduler 158 then returns to operation 630 for each of the next modules, by predicting the resource requirements for those next modules. As such, the expected numbers of events generated by the first module are supplied as inputs to the block sizing calculators of modules that are downstream of the first module in order to predict resource requirements for those modules. The process may continue with successive modules identified in the routing application configuration in order to predict the resource requirements for the entire system. After all of the modules in the routing application have been processed in this way, there are no more next modules to consider in operation 640.

In operation 660, contact center resources are allocated to the routing application based on the predicted requirements of the individual modules. As noted above, the total or overall resource requirements are not always set based on a simple sum of the resources required by the individual modules, and therefore may be further adjusted by an overall system sizing calculator in operation 660. This allocation process may include booting up instances of particular applications (e.g., a number of call controllers, switches, IVR/IMR servers, and the like) for executing the particular routing application.

According to some embodiments of the present invention, the software tool shows the resource usage, in terms of money cost, of implementing the strategy in accordance with the predicted load. This allows the user to redesign the strategy to reduce the cost of implementing such a system, based on budget constraints that may be set by the enterprise. For example, cost reducing strategies may include replacing complex processing systems with simpler ones (such as disabling speech recognition in an interactive voice response system such that the IVR accepts inputs through touch tones only). As another example, adding customer self-help modules may allow some customers to resolve their issues without human agents, thereby reducing agent staffing costs.

As such, embodiments of the present invention allow a non-technical user to specify a strategy for interaction handling at a contact center using high-level modules that correspond to particular business functions and to allocate, automatically, resources to the various modules to understand the costs of implementing the strategy.

In some embodiments of the present invention, resources are allocated to the modules of the contact center in real-time or near real-time based on current load conditions at the contact center. These allocations of resources may include adding more resources when the load is high and deallocating resources when the load is low. In some embodiments of the present invention, the modular configuration system allows the configuration of multiple paths or flows through the modules, where an interaction is routed along different paths based on the current load at the contact center. The routing strategies are configured to be adjusted in real-time based on the specific resource limits (memory, CPU time, and the like) that are encountered by the current routing strategies, by adjusting the flow to modules that have lower resource requirements and by altering the parameters to change the resource loads (e.g., by reducing the resources required to execute the functions or by allocating additional hardware resources to the overloaded modules).

In one embodiment, during runtime, a predicted load determined by executing a block may be used as decision criterion on whether or not to execute a block. For example, if current load is already at a limit and executing the block would exceed the limit, then an alternative path may be taken. In some embodiments, the scheduler 158 accesses load-performance monitoring tools of the ICT environment upon which the routing application is deployed. There is also a design time requirement, when load estimation is used as additional criterion for composing an end-to-end strategy.

Figure 7:
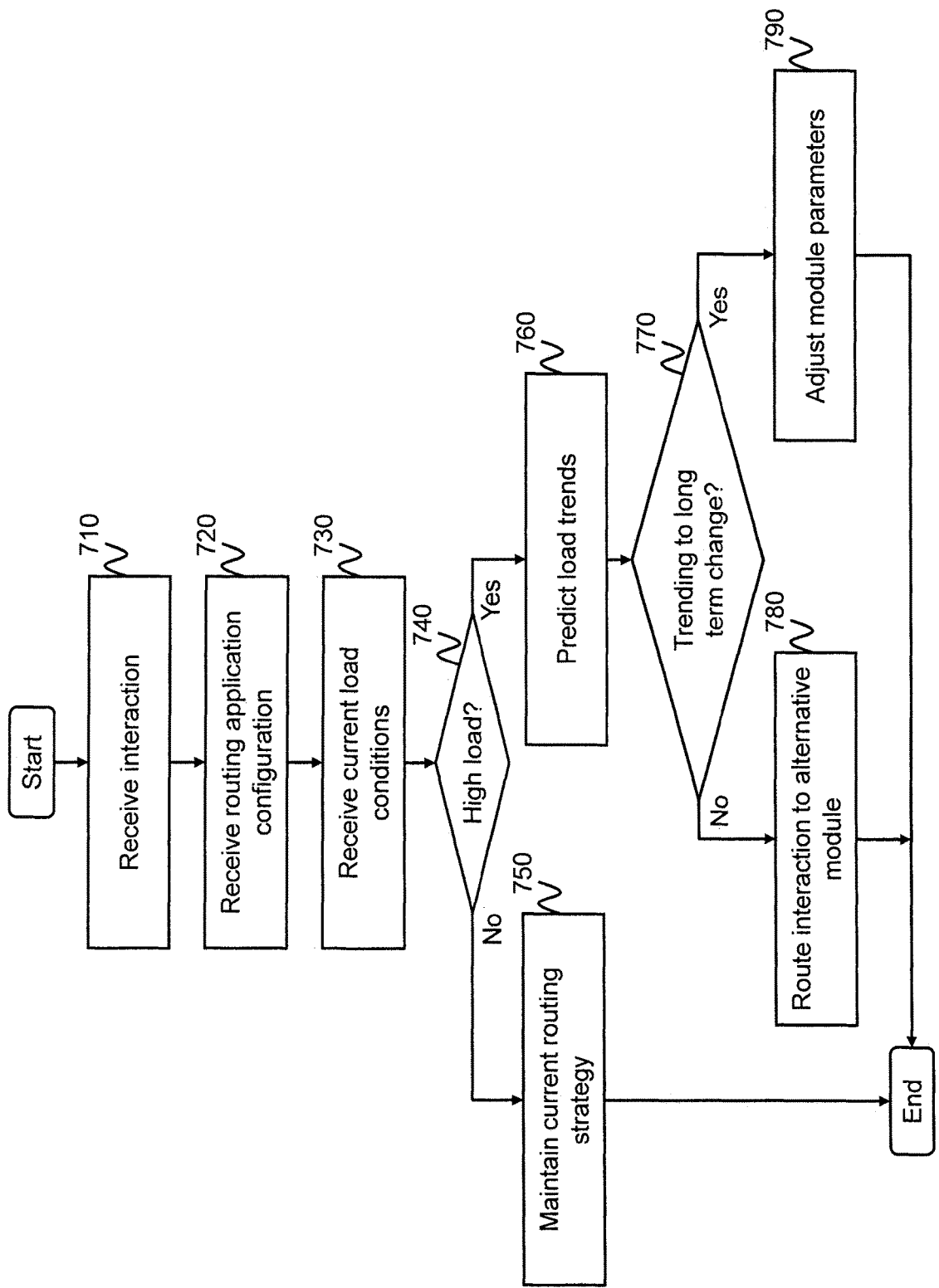
FIG. 7 is a flowchart of a method for allocating resources to modules, during operation, in accordance with one embodiment of the present invention.

FIG. 7 is a flowchart of a method for allocating resources to modules, during operation, in accordance with one embodiment of the present invention. In particular, in the embodiment shown in FIG. 7, when routing a new interaction, the scheduler 158 determines whether the routing strategy is to be modified based on the current load conditions and whether the new interaction is to be processed using the current routing strategy or a modified routing strategy. This allows real-time adjustments based on load, and allows contact center resources to elastically grow and shrink in accordance with conditions and trends.

In operation 710, the scheduler 158 receives a new interaction to route through the modules of the application. In operation 720, the routing application configuration is retrieved, and in operation 730, the current load conditions are received. The current load conditions can be measured, for example, by monitoring the amount of time that an interaction spends within a block (e.g., the entry time and exit time of the interaction from a block). As another example, current load conditions can be retrieved from load information from the underlying hardware of the computer systems supporting the modules, such as current memory usage levels, CPU load averages, CPU percentage utilization, lengths of queues, percentage of bandwidth used, IOPS, and the like. This information can be obtained using performance monitoring or system monitoring tools of the computing systems that the modules are deployed on (e.g., on systems that run the Microsoft Windows operating system, the Windows Performance Monitor may be used, and on Unix and Unix-like operating systems, programs such as ps, iostat, netstat, top, and iotop may be used to collect system load information) The current load conditions are measured on a per-module basis, thereby providing granularity in which portions of the application are experiencing high load.

In operation 740, the received current load conditions are compared with one or more threshold load levels to determine if the current load is high. For example, when the time spent within the module exceeds a set threshold level (e.g., a processing time of more than 2 seconds for routing a call), then the load may be detected as being high. As another example, when memory usage approaches 100% or when swap usage increases beyond a base level, a memory usage threshold may be satisfied. As still another example, if CPU percentage utilization is continuously above 95% for a period of time, the CPU percentage utilization threshold may be satisfied. In addition, in some embodiments, the sizing calculator for each module includes information on the maximum load that can be handled by a module for a given allocation of resources. As such, the load may be detected as being high if the current load exceeds a threshold that may be set based on the maximum load that can be handled by the resources allocated to the module. For example, the threshold may be set based on a percentage of the maximum load, such as a load exceeding 95% of the maximum load of the module. As a more specific example, continuing the above example of a chat server that is sized to handle up to 16,000 concurrent chat sessions, if the number of chat sessions currently being handled exceeds 15,200 chat sessions (95%).

In some embodiments of the present invention, in operation 740 the system determines whether there are the high load conditions by performing a "what-if" calculation by modifying the current load conditions to include the routing of the current interaction based on the current path. The modified load conditions are supplied as inputs to the block sizing calculators of the modules of the routing application. If any of the calculated block sizes exceeds the current maximum load that can be handled by the resources allocated to the module, then it is determined that a "high load" or "overload" condition would occur if the interaction were routed normally.

When no high load condition is detected, then in operation 750 the scheduler 158 maintains the current routing strategy and routes the interaction accordingly.

However, when a high load condition is detected, then in operation 760 the future load trends may be predicted. For example, the load conditions may be predicted for the upcoming one minute or five minutes of activity at the contact center. The prediction may be performed using autoregression based on recent load conditions.

In operation 770, the scheduler 158 determines whether the current trend reflects a long term change in load that would require additional instances of the modules (e.g., booting additional servers to handle the load) or if the overload condition is temporary.

If the overload condition is temporary, then, in one embodiment, in operation 780 the scheduler 158 routes the interaction to an alternative module that provides similar functionality with lower resource requirements, based on the availability of resources. In other words, the alternative module is capable of handling an interaction that is in the same state that the original module would have handled. For example, an interaction may initially be routed to an IVR so that the customer can indicate the purpose of the interaction. Under typical load conditions, the IVR may be configured to accept speech input (e.g., so that the customer can speak the reason for the call), and the IVR may use automatic speech recognition to recognize words in the speech in order to determine how to route the call. However, under heavy load conditions, there may be insufficient computing resources to perform live speech recognition (e.g., there may be a long delay before the customer's speech can be processed). As such, the scheduler can route the call to an IVR that presents a menu of options for the user to select from, and so that the user can press a key on a touch tone phone to specify the reason for initiating the interaction. In other words, the alternative modules (e.g., the speech recognition IVR and the touch tone IVR) are configured to handle interactions that are in the same state (e.g., new interaction with reason not determined) to transition to the interaction to a similar state (e.g., interaction with reason determined). As another example, when an interaction is to be transitioned from an unrouted state (e.g., interaction with reason determined) to a routed state (e.g., interaction with routing determined) and an interaction routing module is overloaded in terms of CPU usage, then rather than wait for the routing system to identify the best agent to handle the interaction (e.g., based on matching skill set and personality), a simpler routing module, that consumes fewer CPU cycles, may be used that identifies an acceptable agent satisfying a minimum set of skills.

This routing to alternative modules allows graceful degradation of service when the load is too high. In some embodiments, current interactions continue to be processed along the paths that the scheduler 158 initially routed those interactions onto, but new interactions are routed along the alternative paths until load conditions return to nominal (e.g., non-overload) levels.

If the overload condition is predicted to persist over a longer term, then the scheduler 158 may modify one or more module parameters in operation 790. The changes in the parameters may change (e.g., reduce) the resources consumed by a module. Different types of modules may have different workloads (e.g., input/output versus CPU versus memory versus bandwidth). For example, a logging module may change its logging level to a less detailed level in order reduce the IOPS and current processing load, whereas a speech recognition engine may change the automatic speech recognition techniques used in order to reduce CPU usage and memory consumption. As another example, a call recording system may reduce the bit rate of the recorded calls if available storage space is dwindling.

The changes in the parameters may also cause additional instances of servers to be added (e.g., more hardware resources can be allocated) to the application. The time of the prediction in the future may be set based on the amount of time required to launch a new instance (e.g., server) and add the additional instance to the application. The block sizing calculators may also be used to determine whether the changing of parameters would have an impact on the load of the system.

In addition, different types of resources have different lag times to start up. As such, the determination as to whether to reroute interactions to a less resource intensive module or to allocate more resources may depend on the time needed to launch an additional instance of a module. For example, changing a parameter on a running server (e.g., changing a logging level) may have an essentially instantaneous effect, whereas booting an additional server may take five minutes, and whereas allocating additional agents to a particular task may require several minutes for the agents to finish their current tasks, or may require calling in additional agents to begin working on an emergency basis, which may take hours.

In some embodiments of the present invention, a cost constraint may also be used to determine whether to incur the expense of launching additional instances, as in operation 790, to handle the load or if the services should be degraded to less resource intensive alternative modules, as in operation 780.

In some embodiments of the present invention, before adjusting one or more parameters of a module or routing interactions to an alternative module, the scheduler 158 predicts the impact of the change on the load experienced at other modules, due to interdependencies between the modules. For example, switching to an alternative module that may have lighter processing requirements may have the effect of accelerating the routing of interactions past a bottleneck, and may significantly increase the volume of interactions to be handled by a downstream module. As such, in some embodiments of the present invention, the scheduler 158 may make changes to parameters of multiple modules when adjusting the routing strategy in response to an overload condition at one of the modules.

In some embodiments, the high load condition 740 is detected before an overload condition is reached (e.g., high, but still responsive levels of load), and the prediction of load trends is used to preemptively resize modules before those additional resources are actually needed, in order to reduce any impact on the quality of service.

As such, aspects of embodiments of the present invention are directed to systems and methods for configuring contact centers, including routing applications for a contact center, where the configuration process includes the connection of business function focused modules that include sizing calculators for automatically allocating contact center hardware resources based on the expected load or traffic that will be handled by the modules. Aspects of embodiments of the present invention also relate to systems and methods for automatically resizing the resources allocated to the modules or changing configuration parameters based on changes in load conditions during runtime, and are also directed to systems and methods for specifying and executing alternate modules in response to changes in load conditions during runtime.

Computer Systems

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 8A, FIG. 8B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 8A:
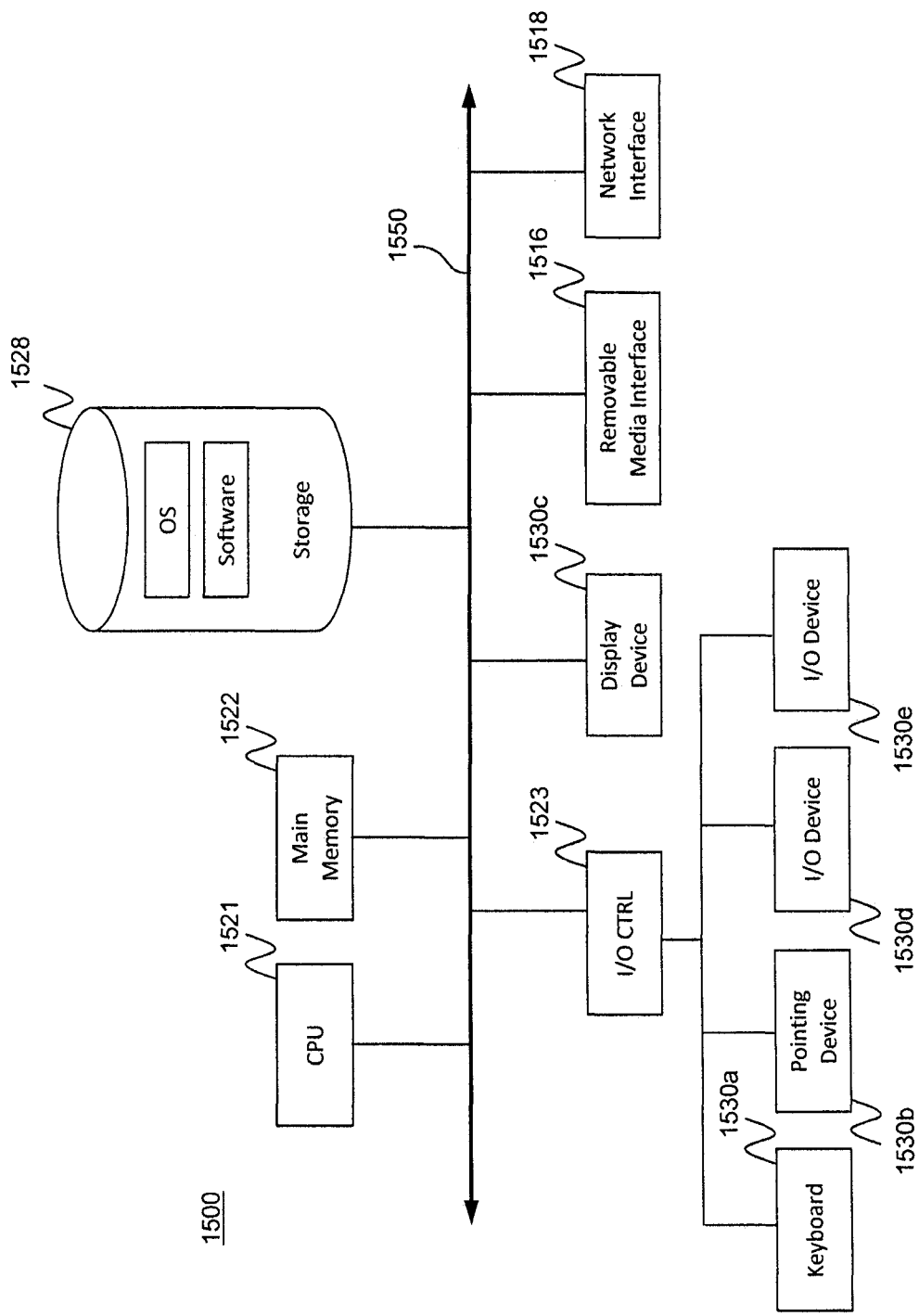
FIG. 8A is a block diagram of a computing device according to an embodiment of the present invention.
Figure 8B:
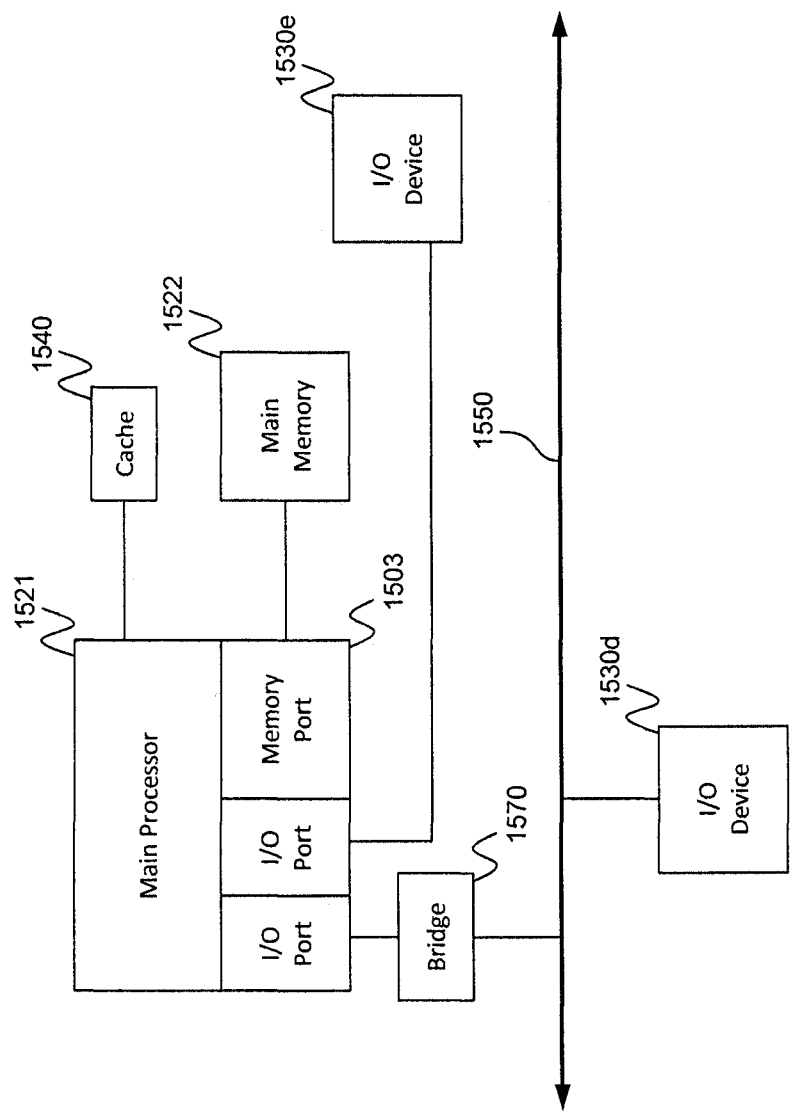
FIG. 8B is a block diagram of a computing device according to an embodiment of the present invention.

FIG. 8A and FIG. 8B depict block diagrams of a computing device 1500 as may be employed in exemplary embodiments of the present invention. Each computing device 1500 includes a central processing unit 1521 and a main memory unit 1522. As shown in FIG. 8A, the computing device 1500 may also include a storage device 1528, a removable media interface 1516, a network interface 1518, an input/output (I/O) controller 1523, one or more display devices 1530*c*, a keyboard 1530*a* and a pointing device 1530*b*, such as a mouse. The storage device 1528 may include, without limitation, storage for an operating system and software. As shown in FIG. 8B, each computing device

1500 may also include additional optional elements, such as a memory port 1503, a bridge 1570, one or more additional input/output devices 1530*d*, 1530*e* and a cache memory 1540 in communication with the central processing unit 1521. The input/output devices 1530*a*, 1530*b*, 1530*d*, and 1530*e* may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 8A, the central processing unit 1521 communicates with the main memory 1522 via a system bus 1550. As shown in FIG. 8B, the central processing unit 1521 may also communicate directly with the main memory 1522 via a memory port 1503.

FIG. 8B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 8A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530*c*, the central processing unit 1521 may communicate with the display device 1530*c* through an Advanced Graphics Port (AGP). FIG. 8B depicts an embodiment of a computer 1500 in which the central processing unit 1521 communicates directly with I/O device 1530*e*. FIG. 8B also depicts an embodiment in which local busses and direct communication are mixed: the central processing unit 1521 communicates with I/O device 1530*d* using a local system bus 1550 while communicating with I/O device 1530*e* directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 8A, may control the I/O devices. The I/O controller may control one or more I/O devices such as a keyboard 1530*a* and a pointing device 1530*b*, e.g., a mouse or optical pen.

Referring again to FIG. 8A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may include multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 8A and FIG. 8B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figure 8D:
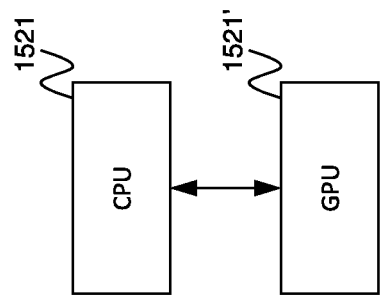
FIG. 8D is a block diagram of a computing device according to an embodiment of the present invention.
Figure 8C:
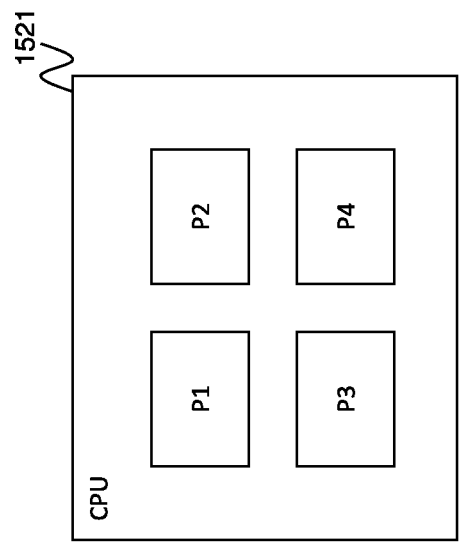
FIG. 8C is a block diagram of a computing device according to an embodiment of the present invention.

As shown in FIG. 8C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 8D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 8E:
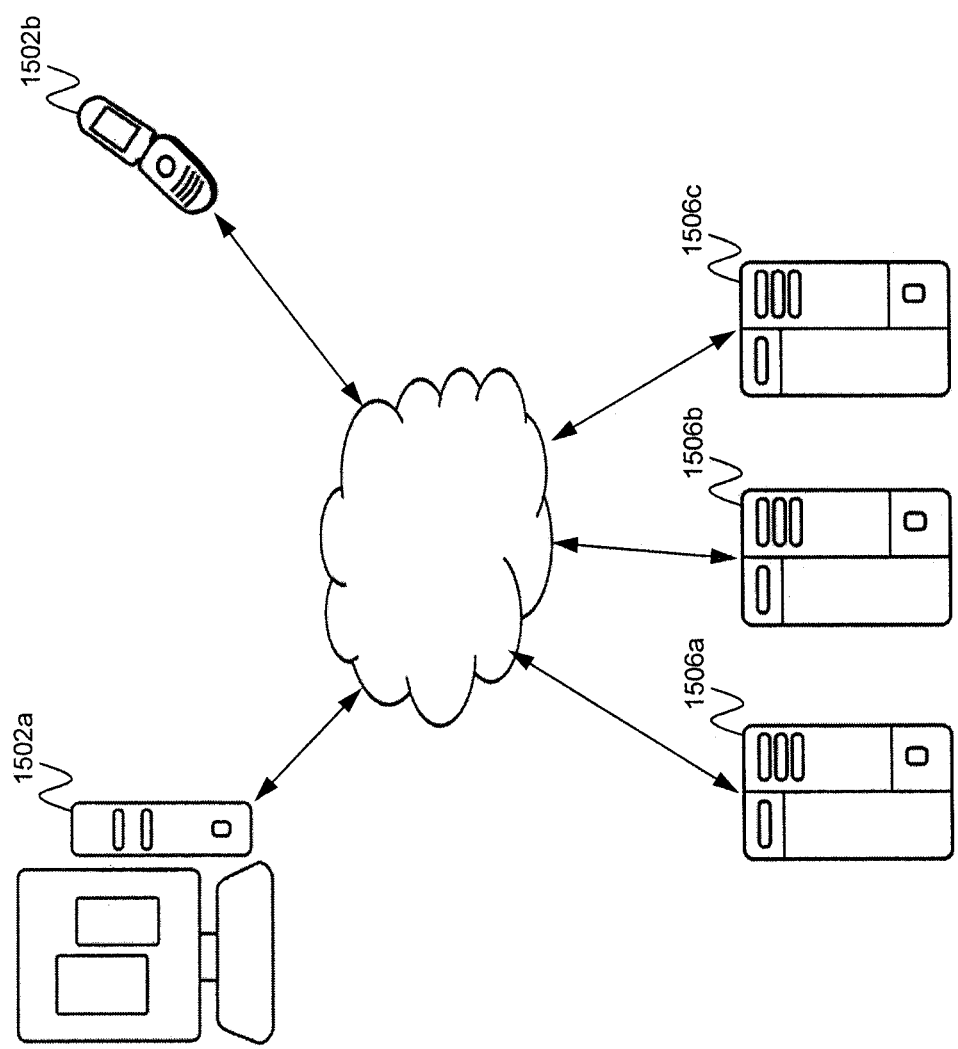
FIG. 8E is a block diagram of a network environment including several computing devices according to an embodiment of the present invention.

A computing device may be one of a plurality of machines connected by a network, or it may include a plurality of machines so connected. FIG. 8E shows an exemplary network environment. The network environment includes one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 8E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 8E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization are also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for allocating resources to a contact center, the method comprising:

receiving, by a processor, configuration data for configuring a contact center, the configuration data including configuration parameters defining a plurality of modules, each of the plurality of modules being configured to provide a discrete function relating to contact center operation, wherein the configuration parameters for a first module of the plurality of modules includes identification of a second module of the plurality of modules linked to the first module to control the first module to perform a first discrete function on an interaction and to control the second module to perform a successive second discrete function on the interaction after the performance of the first discrete function on the interaction by the first module, wherein the plurality of modules are linked according to a routing strategy;

receiving, by the processor, a predicted load of interactions to be processed by the contact center;

computing, by the processor, based on the predicted load on the contact center, a first resource requirement of the first module;

computing, by the processor, based on the predicted load on the contact center, a first output load of the first module;

computing, by the processor, a second resource requirement of the second module based on the first output load of the first module; and allocating, by the processor, contact center resources to the first module and the second module in accordance with the first resource requirement and the second resource requirement requirement;

wherein the computing the first resource requirement comprises:
  loading a first sizing calculator associated with the first module; and
  supplying the configuration parameters of the first module and the predicted load to the first sizing calculator to calculate the first resource requirement;

wherein the computing the second resource requirement comprises:
  loading a second sizing calculator associated with the second module, the second sizing calculator being different from the first sizing calculator; and
  supplying the configuration parameters of the second module and the first output load to the second sizing calculator to calculate the second resource requirement.

2. The method of claim 1, wherein the configuration parameters comprise business level parameters excluding hardware resource parameters.

3. The method of claim 1, wherein the modules further comprise a third module and the configuration parameters further comprise a link from the first module to the third module,
  wherein the first module is configured to perform a first function, the second module is configured to perform a second function, and the third module is configured to perform a third function,
  wherein the method further comprises receiving historical data regarding a first proportion of interactions that perform the second function after the first function and a second proportion of interactions that perform the third function after the first function,
  wherein computing the first output load from first module to second module is performed in accordance with the first proportion.

4. The method of claim 3, wherein the method further comprises:
  computing a second output load from the first module to the third module in accordance with the second proportion; and
  computing a third resource requirement of the third module based on the second output load, and
  wherein the allocating the contact center resources is further performed in accordance with the third resource requirement.

* * * * *